Aug. 22, 1944.  G. W. DUNHAM  2,356,573
WASHING MACHINE
Filed Sept. 15, 1939   2 Sheets-Sheet 2

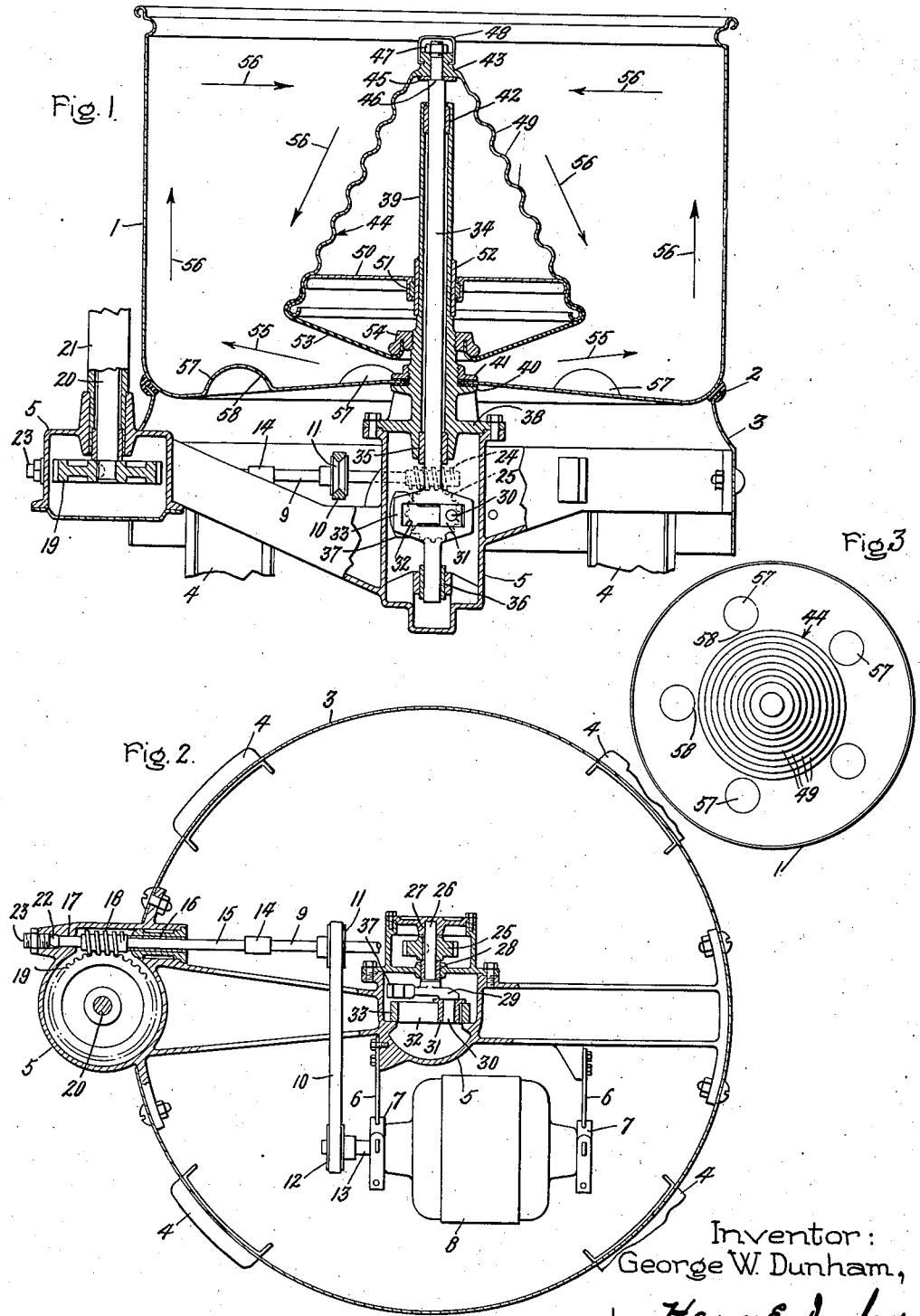

Inventor:
George W. Dunham,
by Harry E. Dunham
His Attorney.

Patented Aug. 22, 1944

2,356,573

UNITED STATES PATENT OFFICE 2,356,573

WASHING MACHINE

George W. Dunham, Westport, Conn., assignor to General Electric Company, a corporation of New York Application September 15, 1939, Serial No. 295,071

3 Claims. (Cl. 68—54)

The present invention relates to washing machines of the type in which the clothes are washed by the action of a reciprocating agitator.

The object of my invention is to provide an improved construction and arrangement in washing machines of this type, and for a consideration of what I believe novel and my invention attention is directed to the following description and the claims appended thereto.

Figure 4:
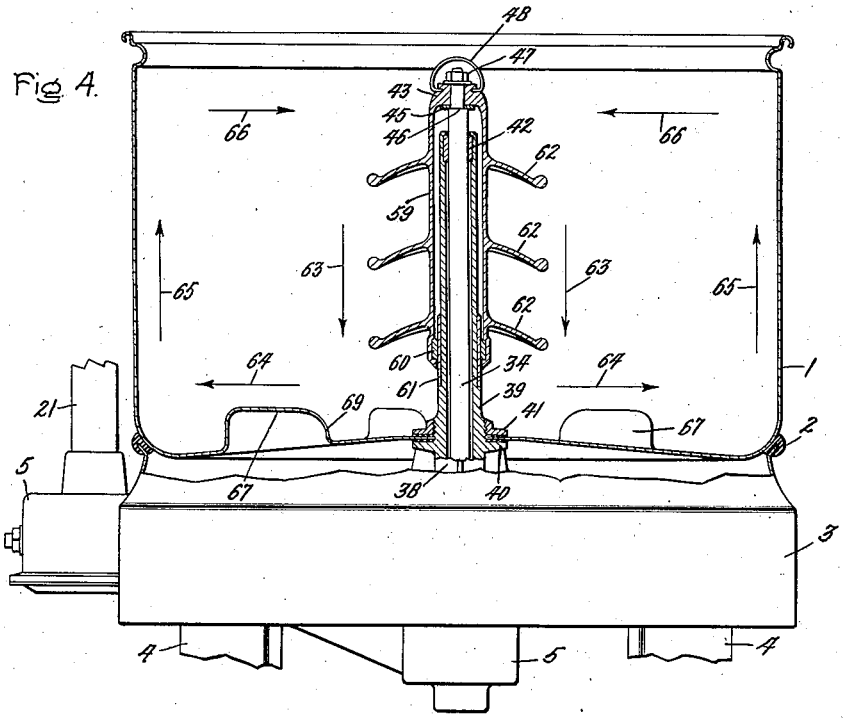
Figure 5:
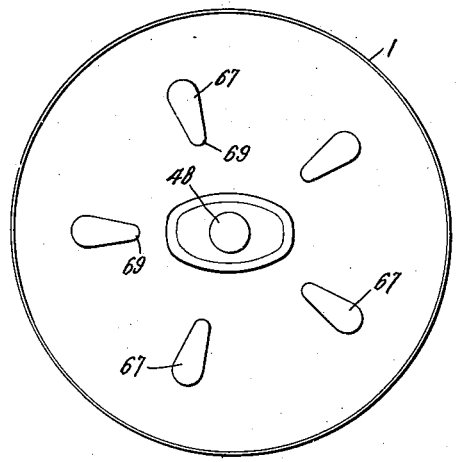
Figure 6:
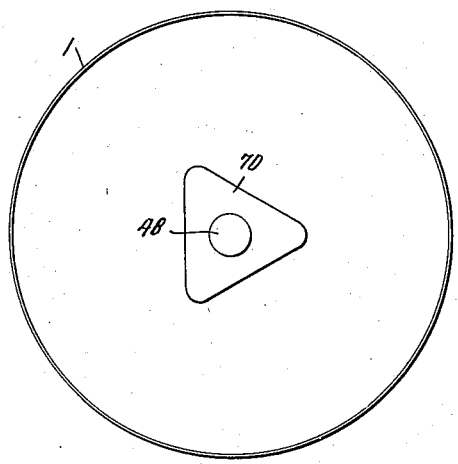

In the accompanying drawings, Fig. 1 is a sectional elevation of a washing machine embodying my invention; Fig. 2 is a sectional top plan view of the driving mechanism; Fig. 3 is a top plan view of the washing machine; Fig. 4 is a sectional elevation of a modification; and Figs. 5 and 6 are top plan views showing modifications of the agitator construction and of the construction for preventing tangling of the clothes.

Referring to the drawings, there is shown a washing machine having a tub 1 supported on a rubber bead 2 on the upper edge of a cylindrical skirt 3 to which are secured supporting legs 4. Extending diametrically across the skirt and secured at each end thereto is a gear casing 5 on which are fixed supports 6 carrying rubber rings 7 supporting an electric motor 8. The motor drives a worm shaft 9 by means of a belt 10 running over pulleys 11 and 12 fixed respectively to the worm shaft and to the motor shaft 13. The worm shaft 9 is connected by a flexible coupling 14 to a worm shaft 15 journaled in bearings 16 and 17 in the gear casing. A worm 18 cut in the worm shaft 15 drives a worm gear 19 keyed to a vertical wringer drive shaft 20 journaled in a wringer post 21 fixed in the gear casing. The wringer drive shaft 20 drives a wringer (not shown) suitably mounted on the upper end of the wringer post 21. The end thrust of the worm shaft 15 is taken by a ball thrust bearing 22 arranged between the end of the worm shaft and a plug 23 adjustably threaded into the gear casing.

The worm shaft 9 has cut therein a worm 24 which drives a worm gear 25 keyed to a crank shaft 26 journaled in bearings 27 and 28. The crank shaft is provided with a crank 29 having a crank pin 30 rotatable in a square block 31 slidable in a horizontal slot 32 in a cross head 33. The cross head is integral with a vertical shaft 34 slidable in guide bearings 35 and 36 in the gear casing. The above described construction provides a Scotch yoke drive for reciprocating the vertical shaft 34. Vibration is decreased by a counterweight 37 on the crank shaft 26.

On the upper side of the gear casing is fixed a casting 38 which carries the guide bearing 35 and which has a tubular post 39 projecting upward through the bottom of the tub. The bottom of the tub is clamped between a flange 40 on the post 39 and a flange 41 on a nut threaded on the post, suitable gaskets being provided between the flanges and the adjacent surfaces of the tub to prevent leakage. The upper end of the tubular post 39 projects above the normal water level in the tub and at its upper end carries a guide bearing 42 for the vertical shaft 34. The upper end of the vertical shaft 34 projects above the tubular post 39 and is fixed to the hub 43 of an agitator 44. The agitator hub is clamped between a washer 45 seated on a shoulder 46 on the shaft and a nut 47 threaded on the shaft. Leakage around the shaft is prevented by a cap 48 secured to the agitator hub and enclosing the upper end of the shaft. The body of the agitator is cone shaped with vertically extending side walls flaring downward and outward toward the bottom of the tub. The agitator side walls have horizontal corrugations 49 which provide rubbing projections. Within the lower end of the agitator is fixed a spider 50 carrying a guide bearing 51 slidable on a sleeve 52 on the tubular post 39. The bottom of the agitator is closed by a flexible disk or wall 53 of rubber or similar material fixed at its outer edge to the lower edge of the agitator and fixed at its inner edge to a nut 54 threaded on the tubular post 39. During vertical reciprocation of the agitator the outer edges of the disk 53 move up and down with the agitator. The disk, accordingly, pivots or hinges about its inner edges which are fixed to the nut 54. During downward movement of the agitator the liquid between the disk and the bottom of the tub is squeezed or forced radially outward. During upward movement of the agitator liquid tends to be drawn in between the bottom of the tub and the skirt. It has been found that the outward movement of the liquid is of greater force than the inward movement, and the liquid accordingly has a net circulation radially outward from the agitator in the direction of the arrows 55. This induces a circulation of liquid upward along the side walls of the tub, inward at the top of the tub, and downward along the side walls of the agitator, as indicated by the arrows 56. This circulation is aided to some extent by the flaring of the side walls of the agitator which tend to cause the clothes to be moved downward. The flaring side walls also help keep the clothes in contact with the corrugations during the downward movement. The circulation indicated by the arrows 56 takes place substantially in radial planes around the agitator. From one aspect the agitator can be considered as comprising a scrubbing surface, corrugations 49, and a liquid impelling surface, disk 53.

There is some tendency for the clothes to tangle. In the usual condition of tangling, long flexible parts of clothes, such as shirt sleeves and apron strings, become wrapped around the heavier clothes, such as towels, producing a knotted mass of clothing. This mass of clothing cannot be effectively washed, since only the outer surfaces thereof are exposed to the action of the agitator. The tangled mass of clothes also restricts the circulation of the clothes and keeps all of the surfaces of the clothes from coming into contact with the agitator. This means that some surfaces of the clothes will not be washed. Tangling, therefore, both interferes with the washing action and makes the washing action non-uniform. In the present construction, tangling is prevented by projections 57 on the bottom of the tub having leading edges 58 projecting into and presented to the radially moving currents indicated by the arrows 55. The projections 57 have a combing action on the clothes which straightens the clothes and eliminates tangling.

In the use of the washing machine the tub is filled with liquid and clothes, and the agitator is reciprocated vertically through an amplitude of the order of from one inch to one inch and a half and at a rate of the order of from two hundred to four hundred complete oscillations per minute. The amplitude is such that the agitator remains substantially submerged in the liquid during its reciprocation, and the speed of reciprocation is such that the clothes, due to their inertia, remain substantially stationary and are subjected to a vigorous rubbing or scrubbing action by the corrugations or rubbing projections 49 on the outer surface of the agitator. At the same time the liquid and clothes are given a relatively slow circulation in radial planes around the agitator, as indicated by the arrows 55 and 56. This produces a circulation of the clothes so that all of the clothes are brought into contact with the agitator. As explained above, tangling of the clothes is prevented by the projections 57. There is considerable latitude in the choice of the amplitude and speed of reciprocation. With higher speeds, either the amplitude is less or the washing action faster due to the greater power input. It is important that the agitator remain substantially submerged in the liquid. If the agitator is lifted entirely clear of the liquid on the upward stroke, applicant's washing action is not obtained. The turbulence due to the movement of the agitator into and out of the liquid would interfere with the circulation of the liquid, indicated by arrows 55 and 56. In applicant's construction, when the greater part of the agitator is submerged at all times and the speed of reciprocation is high, the agitator merely "flutters" or "vibrates" relative to the clothes which are suspended in the liquid by inertia and the washing action is mainly effected by the scrubbing or rubbing action of the corrugations on the clothes, which flexes the fabric and loosens the dirt between the fibers.

In the washing machine shown in Figs. 4 and 5 the construction of the tub and driving mechanism is identical with the previously described construction, and corresponding parts are indicated by the same reference numerals. The agitator has a hub 43 secured to the upper end of the vertical shaft 34 and having a tubular portion 59 depending around the tubular post 39 and having a guide bearing 60 at its lower end slidable on a sleeve 61 on the post. Projecting from the tubular portion 59 are three vertically spaced horizontal vanes 62, which as shown in Fig. 5, are oval shaped. The vanes extend radially outward and downward from the agitator, and, accordingly, during downward movement of the agitator exert a greater thrust on the liquid than during the upward movement of the agitator. This results in a net downward circulation of liquid around the agitator in the direction of the arrows 63. The reverse circulation can be obtained by inclining the vanes upwardly instead of downwardly. In the present construction, the agitator shaft 34 is reciprocated by a Scotch yoke which produces a harmonic motion in which the upward and downward strokes are of the same speed. By using a reciprocating mechanism in which the speed of reciprocation is faster in one direction, there will be a tendency to produce a net recirculation around the agitator in the direction of the faster stroke. Upon striking the bottom of the tub, the water currents are deflected radially outward in the direction of the arrows 64, and the water flows upward along the sides of the tub and inward toward the agitator at the top of the tub, as indicated by the arrows 65 and 66. The circulation of liquid indicated by the arrows 63 to 66 inclusive takes place in radial planes around the agitator. Due to the oval shape of the vanes 62, this circulation is more vigorous in a vertical plane along the longer axis of the vanes than in the vertical plane along the shorter axis of the vanes. This causes a relative movement between the clothes which results in a circumferential movement of the clothes around the tub. The net result is that the paths of circulation of the clothes are longer and the clothes have a longer time to untangle. The tendency to tangle is further decreased by radial projections 67 formed in the bottom wall of the tub. These radial projections are of stream-lined shape with the narrow ends adjacent the agitator and with the leading edges 69 presented to the radially moving clothes at the bottom of the tub. The projections 67 have the same function as the projections 57 in the previously described construction. The combing action is somewhat greater due to the shape of the projections.

In the use of the machine the agitator is reciprocated vertically through an amplitude of the order of one inch, and at a rate of from two hundred to three hundred complete reciprocations per minute. The under sides of the vanes 62, due to their downward inclination, have a greater liquid propelling action than the upper sides of the vanes. The vanes, accordingly, produce the downward circulation around the agitator, indicated by the arrows 63, which induces the circulation in radial planes indicated by arrows 64, 65 and 66. Throughout the reciprocation the vanes 64 remain submerged in the liquid, and the clothes surrounding the vanes are subjected to a rubbing or scrubbing action by the rounded outer edges of the vanes. The clothes are substantially stationary relative to the liquid, while the agitator is moving at a much more rapid rate. The contact of the outer edges of the vanes 62 with the clothes accordingly subjects the clothes to a fluttering action which flexes the fabric and loosens the dirt between the fibers. In this agitator, the rounded edges serve as the rubbing projections and the lower surfaces of the vanes serve as the liquid impelling surfaces. The differences in the rates of circulation around the agitator, caused by the varying radial extent of the vanes 62, tends to prevent the clothes from tangling. This is due to the fact that the faster moving clothes pull away from the slower moving clothes, disengaging any parts that might be tangled. From another aspect, the projections 67 serve to break up the uniformity of movement of the radially moving mass of clothes at the bottom of the tub.

The construction shown in Fig. 6 is the same as that shown in Figs. 4 and 5, except for the shape of the agitator vanes 70 which are triangular. This results in three equally spaced regions around the agitator in which the radial circulation of the liquid and clothes is rapid, and three intermediate regions in which the radial circulation is slower. The washing action is the same as in the construction of Figs. 4 and 5.

What I claim as new and desire to secure by Letters Patent of the United States is:

1. In a washing machine, a tub, a vertically reciprocable agitator in the central part of the tub for agitating the liquid and clothes, means for reciprocating the agitator vertically in the tub, liquid-impelling surfaces on the agitator for causing the liquid and clothes to flow radially along the bottom of the tub in closed radial unidirectional circulatory paths, and combing projections on the bottom of the tub circumferentially spaced apart radially outward of the agitator projecting into and having leading edges around and spaced from the agitator presented to the radially moving clothes at the tub bottom for combing the clothes to prevent tangling.

2. In a washing machine, a tub, an agitator at the central part of the tub, means for reciprocating the agitator vertically in the tub, the agitator being substantially wholly submerged in the liquid during its reciprocation, rubbing projections on the agitator, liquid-impelling surfaces on the agitator effective to induce a unidirectional circulation of the liquid and clothes in closed circulatory paths in radial planes, and combing projections on the tub spaced around and radially outward of the agitator and having leading edges around and spaced from the agitator projecting into said paths and presented to the liquid and clothes for combing the clothes to prevent tangling.

3. In a washing machine, a tub, a vertically reciprocable agitator at the center of the tub, horizontal vanes on the agitator, means for reciprocating the agitator vertically, said vanes being substantially wholly submerged during the reciprocation and causing a unidirectional vertical flow of liquid at the center of the tub inducing a radial flow of liquid at the bottom of the tub, and projections on the bottom of the tub projecting into and having leading edges presented to the radially moving clothes at the tub bottom for combing the clothes to prevent tangling.

GEORGE W. DUNHAM.